June 24, 1947. R. H. COLWILL 2,422,773
TOOLMAKER'S UTILITY BLOCK
Filed July 24, 1945 3 Sheets-Sheet 1
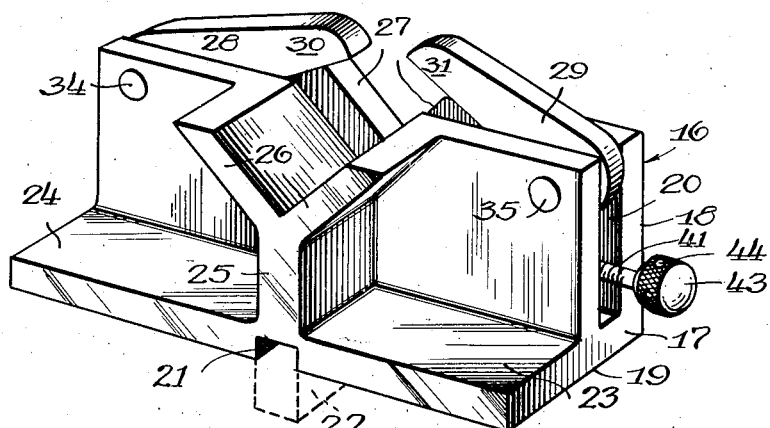
Fig.1
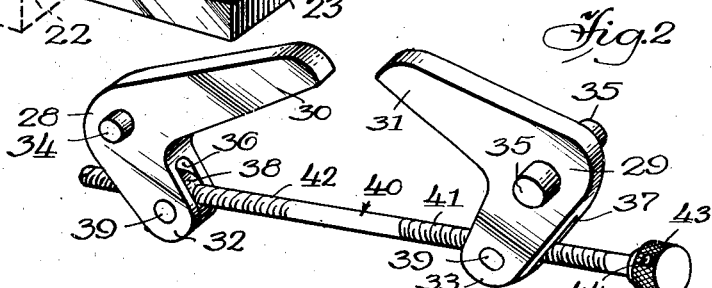
Fig.2
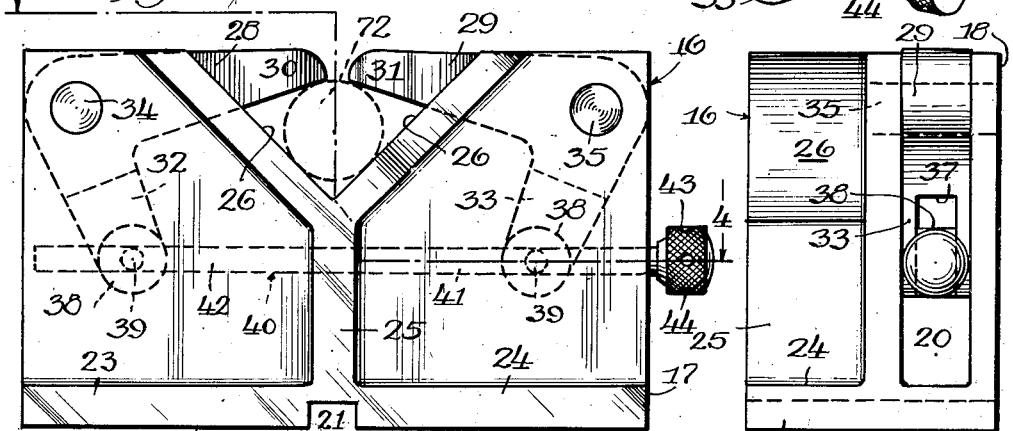
Fig.3
Fig.5
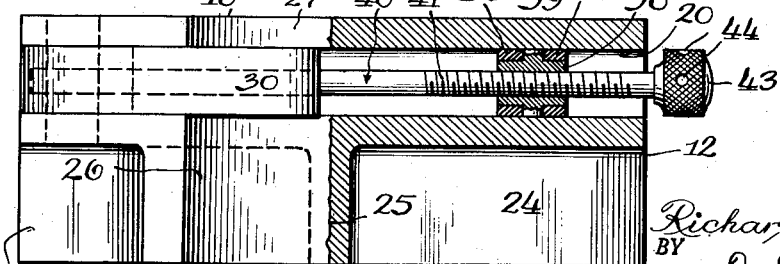
Fig.4
INVENTOR.
Richard H. Colwill
BY
David Manly Heller
Attorney.

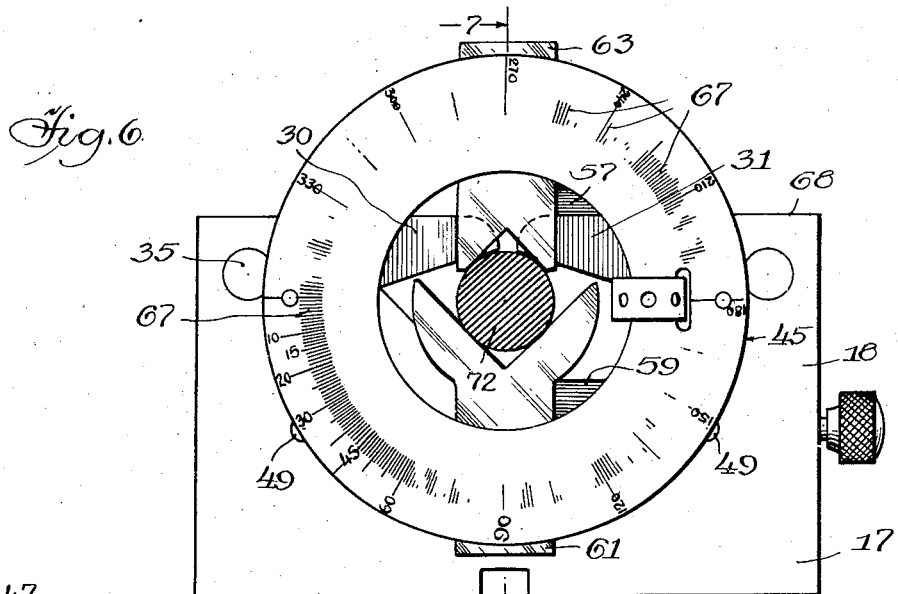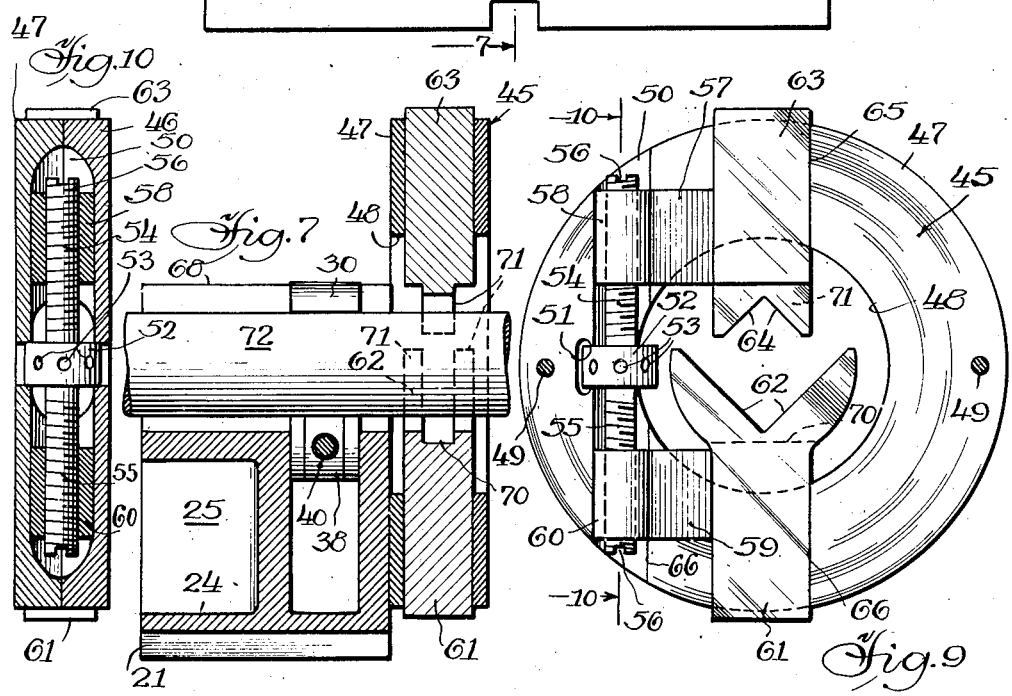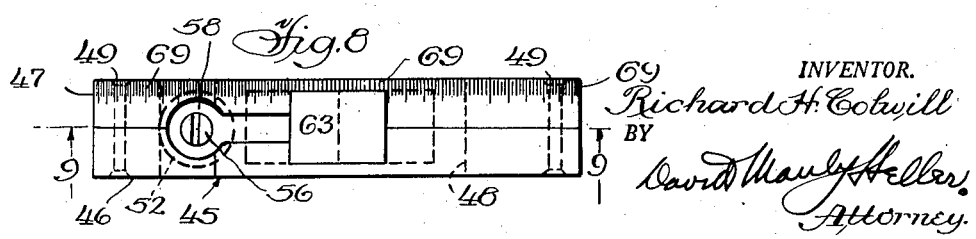

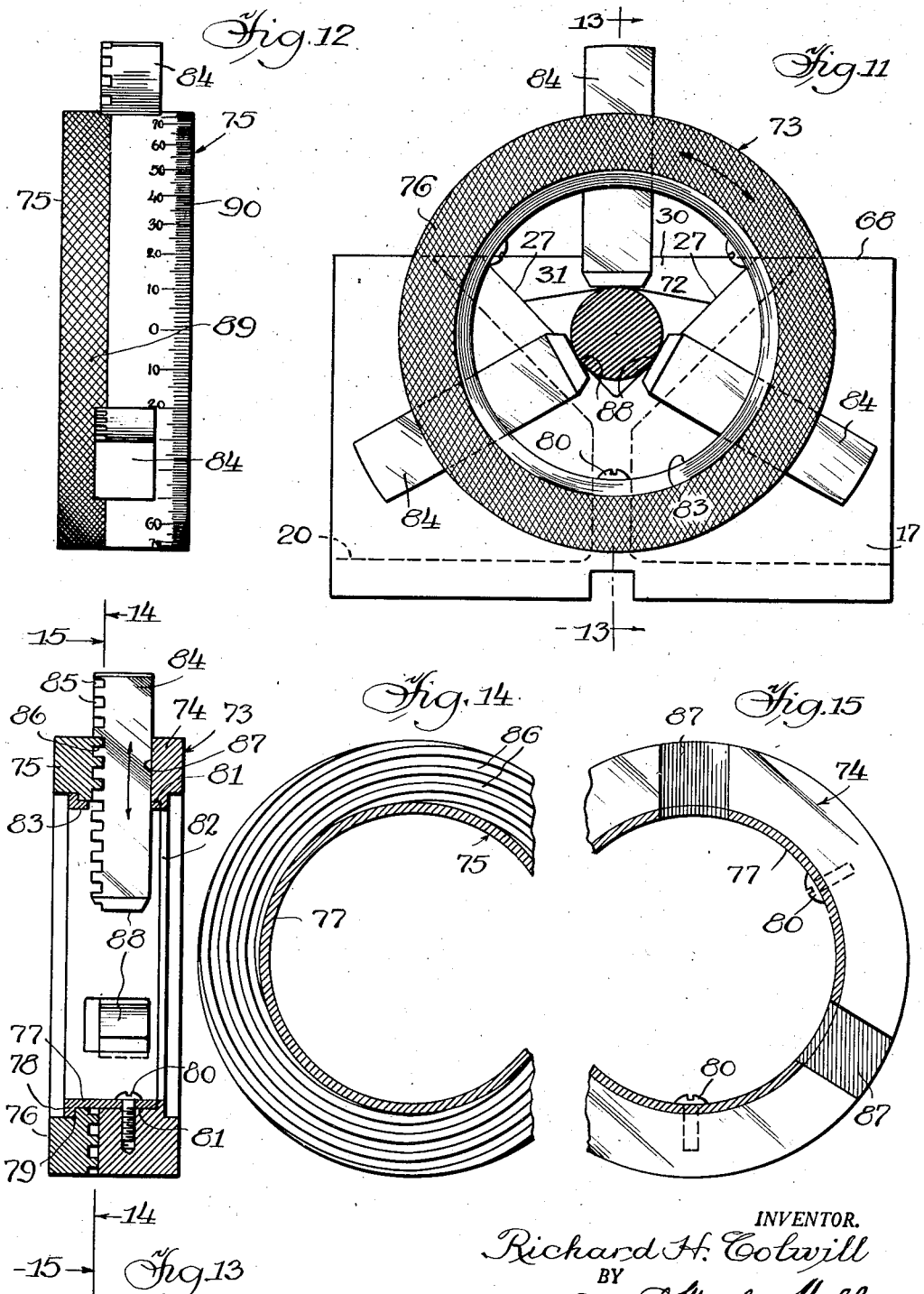

Patented June 24, 1947

2,422,773

UNITED STATES PATENT OFFICE 2,422,773

TOOLMAKER'S UTILITY BLOCK

Richard H. Colwill, Chicago, Ill.

Application July 24, 1945, Serial No. 606,787

6 Claims. (Cl. 90—60)

My instant invention appertains to utility blocks employed in connection with machining operations, a time-saving tool for use by machinists, tool makers and individuals in other similarly allied trades.

An object of my invention is to provide a gripping V block equipped with articulately positioned duplex clamping means operable and controllable by a single clamp control to effectuate clamping or releasing of a piece of material to be secured in the said utility block.

Another object of my invention is to provide a utility V block and angle plate in combination therewith, the said structure being equipped to retain articulately two bell-crank clamp elements operated simultaneously, and governed by a single manipulative control for clamping and releasing from clamping engagement the said bell-crank clamp elements.

Another object of my invention is to provide a combination utility block of the aforementioned character in conjunction with a dividing head instrument, which may be removably secured to pieces of work to be operated upon for dividing the periphery thereof into any number of divisions which may be required in certain machining operations.

Another object of my invention is to provide a combined utility block and dividing head structure in which the clamping jaws are operable by the manipulation of a single control, or motivating means, having right and left handed threaded engagement with the jaws, respectively, so as to move them, simultaneously, inwardly or outwardly depending on the rotation of the said manipulative control.

Another object of my invention is to provide a slightly modified form of dividing head in which the jaws are operated through a scroll engaging the said jaws, so that the same operates in similar fashion to a universal scroll chuck construction, wherein by rotating one of the ring elements comprising the said structure in one direction, the jaws will be uniformly and equidistantly moved outwardly with respect to a focal center, while if the rotation of the said manipulative ring is reversed, the jaws will move inwardly toward a common central point, the said jaws being housed to work radially inwardly and outwardly with respect to the dividing head structure.

A still further object of my invention is to provide a utility block of the aforementioned character which may be utilized independently or in conjunction with a dividing head structure, a combined tool of great utility in practice, and which is also of such simple construction as to lend itself readily to economical manufacture in quantity production.

Other features and ancillary objects of my invention may be readily recognized by reference to the accompanying drawings, and may be impliedly suggested when taken in consideration with respect to the ensuing description, wherein like symbols are used to designate like parts, and in which:

Fig. 1 represents a perspective view of a utility block comprising my invention.

Fig. 2 is a perspective view of the clamping elements per se isolated from the block proper.

Fig. 3 is a front view of my utility block.

Fig. 4 is a top view of Figure 3, with a portion thereof indicated in section, and is a view looking in the direction of the arrows 4—4 of Figure 3.

Fig. 5 is an end view of Figure 3.

Fig. 6 is a rear view of the utility block in conjunction with its cooperative adjunct, namely, one form of dividing head structure as secured to a piece of work ready for use and operation.

Fig. 7 is a cross-sectional view taken, substantially, on the line 7—7 of Figure 6.

Fig. 8 is a top view of Figure 6, showing only the dividing head structure.

Fig. 9 is a view looking in the direction of the arrows 9—9 of Figure 8, showing one of the ring elements of the dividing head removed so as to expose the interior working elements thereof.

Fig. 10 is a cross-sectional view taken, substantially, on the line 10—10 of Figure 9.

Fig. 11 is a rear view of my utility block invention used in conjunction with another slightly modified form of dividing head structure, positioned ready for use and operation.

Fig. 12 is an end view of the dividing head indicated in Figure 11.

Fig. 13 is a cross-sectional view taken, substantially, on the line 13—13 of the dividing head indicated in Figure 11, showing the jaws thereof in elevation so as to more clearly distinguish the structural details thereof.

Fig. 14 is a fragmentary view of the scroll ring as seen when looking in the direction of the arrows 14—14 of Figure 13, and Fig. 15 is a fragmentary view of the guide ring element of the dividing head as seen when looking in the direction of the arrows 15—15 of Figure 13.

Referring to the various views, it will be noted that my invention, namely, the utility block is, generally, designated 16, and is comprised of a body section 17 of angular formation with finished surfaces 18 and 19 in order to provide correct and accurate locating surfaces; it being further constructed so as to have a centrally located rib 25 terminating in the V locating portions 26 and 27 separated by the slotted recess 20 which is to house the duplex clamping mechanism later to be more clearly elucidated.

The angular extension portions 23 and 24 may be utilized for clamping the utility block on a machine tool, whereas the slotted portion 21 may be provided with a key 22 which fits into the table of a milling machine or other similar machine tools. The duplex clamping structure consists of the clamps 28 and 29 which are of bellcrank formation, and are provided with pivot studs 35 and 34, the clamping ends thereof being designated 30 and 31, whereas their maneuverable ends are designated 32 and 33 in which are secured the disc bearings 38, having trunnions 39 and being suitably threaded. One bearing 38 having a female left hand thread, whereas the mating bearing having a right hand female thread to mate with the threaded portions 42 and 41, respectively, on the clamp screw 40. The clamp screw 40 terminates in a head 43 which is suitably knurled for preliminary tightening, and also contains a series of spanner holes 44 into which a pin may be inserted for final tightening action.

The pivot pins 35 and 34 are secured in suitably drilled holes in the body 17 so as to articulately function therein and work toward one another, or away from one another, depending on the direction of rotation of the knob 43. A piece of round work 72 may be located in the V portions 26 and 27, and then clamped by the clamping ends 30 and 31 by manipulating the locking screw 43 so as to bring the bottom surfaces of the clamps in frictional and forceful contact with the work piece 72. It can be seen that various diameters of work pieces 72 may be clamped in this manner on the utility block, and then the block may be positioned on various machine tools for certain operations such as milling, shaping, grinding and other operations customarily performed on work in machine shops and manufacturing plants.

When the work is completed, the work may be released by loosening the clamp screw 43, thus releasing the clamps 28 and 29 from engaging the work piece and the piece may then be removed. The bell-crank clamps 28 and 29 are provided with forked ends resulting from the slotted portions 36 and 37, the said forks 32 and 33 forming a suitable housing for the bearings 38 to be cradled therein for clamping and loosening pieces of work in the V block formation 26 and 27.

In Figures 6 to 10, I show a form of utility block having an added adjunct, namely, a dividing head, generally, designated 45, the said dividing head consisting of two plate elements 46 and 47 joined on their inner surfaces and being symmetrical in shape, one being right hand and the other being left hand. The said plates are secured by rivets 49 after the elements have been assembled interiorly thereof, namely the clamping jaws 63 and 61. The said jaws 63 and 61 are equipped with extensions 57 and 59 terminating in threaded bearing portions 60 and 58 being, respectively, right and left hand threads in order to engage the twin screw having corresponding male and female threads 54 and 55, and having a manipulating central knob 52 which operates within a suitable recess 51 in the composite assembled ring structure made up of the rings 46 and 47. The bearing portions 60 and 58 are confined in the bore 50 to operate toward or away from one another in order to close or open the jaws.

The rings are also slotted as indicated at 65 and 66 in order to accommodate slidable jaws 63 and 61, the jaw 63 has a V formation 64 at its terminus mating with a larger V section 62 of the jaw 61, preferably, the jaw termini 71 are of lesser thickness than the body of the jaw 63, while the V portion 62 of the jaw 61 is recessed at its center as indicated at 70 in order to accommodate the termini 71 to permit the roots of V 64 and V 62 to be brought down to clamp the smallest diameter of work. The manipulating control 52 for moving the jaws up and down in their confines 65 and 66, is also provided with spanner holes 53 for more effectively tightening work after preliminary tightening has been made by hand. The opening 48 determines the diametrical extent of the range of the work that can be handled. The slotted ends 56 may be engaged by a screw driver for closing and opening the jaws 61 and 63.

The dividing head, generally, designated 45, after clamping on to a piece of work which has been located in the V block, may be used for demarcating on the periphery thereof various subdivisions in the following manner: It is to be noted that the face of the dividing head 45 carries graduations 67 in degrees from zero to 360, the same also being projected on the outer periphery thereof as indicated at 69 Figure 8.

The top surface 68 of the utility block is accurately finished and acts as a cooperating surface in order to aid in demarcating various divisions on a piece of work 72. After the work has been clamped in position as shown in Figure 6, the zero division may be set to match with the edge of the top surface 68. Now if we wish to divide the work piece 72, and set it up in a milling machine so as to cut a hexagonal shape thereon, all one need do is to set the initial mark zero to meet with the top surface 68 for the first cut. By releasing the clamp screw 43 slightly, the work may be rotated after the first milling has been completed, and the work may then be rotated to 60 degrees, after which the clamp screw is tightened and a second cut is taken, after which the 120 degree demarcation is set up to meet with the surface 68, and another cut taken, and so on, until all cuts are made at 180, 240, and 300 degrees, respectively, thus completing the operation.

During the course of the machining operations, the control securing the dividing head 45 to the work 72 must not be disturbed, inasmuch as, the dividing head is clamped on to the work and functions to aid in rotating the work thru different divisions of a circular ambit or area. Thus also any angles may be laid out with the aid of my dividing head used as an added adjunct in cooperative relationship with the utility block as a holding and releasing means for setting to different divisional positions or locations.

In Figures 11 to 15, I show a slightly modified form of dividing head, generally, designated 73 which is composed of three jaws radially positioned at 120 degrees spacing, and which work simultaneously inwardly and outwardly by the rotation of one of the elements of the dividing head clock-wise or counter clock-wise, one direction effectuating a drawing in of the jaws toward a focal center or point, the opposite rotation withdrawing them radially outwardly.

This dividing head is used in a similar manner as the dividing head of Figure 6 heretofore described, namely its graduations are indexed cooperatively with the edge of the top surface 68 of the utility block. The construction of this slightly modified form of dividing head consists of a stator ring 74 and a rotating ring 75, the two being secured by virtue of the connector bushing 77 which has a head portion 78 and which fits in the recessed counter-bore 79, the body of bushing 77 being a working fit in the bore 81 of the stator ring. The bushing 77 is provided with an opening 83 which will define the range of work that may be clamped thereby. The stator ring 74 is provided with an opening 82 and a counter-bore co-extending therefrom so that the two rings by virtue of the connector bushing 77 may be held rotatably in engagement. The ring 75 is impressed with a scroll or spiral toothed formation 86 so as to engage the mating spiral toothed formation 85 on the set of jaws 84, in order to manipulate them in the direction of the arrows shown in Figure 13 depending on the direction of rotation of the ring 75 being either clock-wise or counter clock-wise. The ring 74 is distinguished from the ring 86 in that, it has no scroll toothed formation, but instead has three slotted portions 87 radially positioned 120 degrees apart in which the jaws 84 are fitted and which prevent the said jaws from rotating with the ring 75 when that is subjected to rotation, thus causing the resultant action of forcing the said jaws 84 inwardly toward a focal point, or outwardly therefrom.

The connector bushing 77 secures the entire structure as heretofore elucidated, and is secured to the stator ring 74 by means of screws 80. When the jaws come in contact with a piece of work, the jaw faces 88 contact the periphery of the work and thus hold it firmly and securely in place. The rotating ring as well as the stator ring are both, preferably, knurled as indicated at 76 and 89 so that one can be held firmly to resist rotation by the rotating ring and to produce a relative rotational movement between the two rings, which in turn results in moving the jaws inwardly and outwardly as heretofore elucidated. This dividing head is like-wise provided with a series of graduations from zero to 360 degrees designated 90 permitting this dividing head to be operated in the same manner as heretofore described and specified for the dividing head, generally, designated 45.

It is the province of the angle plate 17 to cooperate with the dividing heads for measuring purposes. It goes without saying that the angle plate 17 per se may be utilized for the customary uses well known to those skilled in the art.

I believe, I have herein, described rather succinctly the nature and the construction of my invention, and it is apparent that the same is susceptible of various modifications and improvements, hence I reserve the right to all modifications and improvements coming within the scope and spirit of my invention as well as all modifications that are embraced within the embodiments of the accompanying drawings, and moreover all those falling within the purview of the foregoing disclosure.

Having thus described and revealed my invention, what I claim as novel and desire to secure by Letters Patent, is:

1. A utility block of the character described comprising, an angle plate provided with two upright walls defining a slotted recess therebetween, and a V portion located at right angles to the said two upright walls, bell-crank clamping elements articulately secured within the said slotted recess having forked ends at one of their termini, right and left hand threaded bearing elements provided with trunnions articulately confined in the said forked ends, and right and left hand threaded stud means engaging the said threaded bearing elements to govern the motivation of the free ends of the said bell-crank clamp elements to releasably confine a piece of work in the said V portion.

2. A utility block of the character described comprising, an angle plate forming a right dihedral angle and having an inner wall adjacent one of its walls defining a slotted recess therebetween, a V portion located at right angles to the said slotted means being intercepted thereby to form larger and smaller V component portions, and dual clamping means articulately confined in the said slotted recess cooperating with the said V portion to releasably confine a piece of work.

3. A utility block of the character described comprising, an angle plate forming a right dihedral angle and having an inner wall adjacent one of its walls defining a slotted recess therebetween, a V portion located at right angles to the said slotted means being intercepted thereby to form larger and smaller V component portions, dual clamping means articulately confined in the said slotted means cooperating with the said V portion to releasably confine a piece of work, and unitary control means for simultaneously operating the said dual clamping means.

4. A utility block of the character described comprising, an angle plate provided with two upright walls defining a slotted recess therebetween, and a V portion located at right angles to the said two upright walls, bell-crank clamping elements articulately secured within the said slotted recess having forked ends at one of their termini, right and left hand threaded bearing elements provided with trunnions articulately confined in the said forked ends, and right and left hand threaded stud means engaging the said threaded elements to govern the motivation of the free ends of the said bell-crank clamp elements to releasably confine a piece of work in the said V portion, the other wall of the said angle plate being provided with key means adapted to locate the said utility block in a machine tool.

5. A utility block of the character described comprising, an angle plate forming a right dihedral angle and having an inner wall adjacent one of its walls defining a slotted recess therebetween, a V portion located at right angles to the said slotted means being intercepted thereby to form larger and smaller V component portions, and dual clamping means articulately confined in the said slotted recess cooperating with the said V portion to releasably confine a piece of work, the other wall of the said angle plate being provided with key means adapted to locate the said utility block in a machine tool.

6. A utility block of the character described comprising, an angle plate forming a right dihedral angle and having an inner wall adjacent one of its walls defining a slotted recess therebetween, a V portion located at right angles to the said slotted means being intercepted thereby to form larger and smaller V component portions, dual clamping means articulately confined in the said slotted means cooperating with the said V portion to releasably confine a piece of work, and unitary control means for simultaneously operating the said dual clamping means, the other wall of the said angle plate being provided with key means adapted to locate the said utility block in a machine tool.

RICHARD H. COLWILL.

REFERENCES CITED

The following references are of record in the file of this patent:

UNITED STATES PATENTS

| Number | Name | Date |
|---|---|---|
| 1,936,263 | Pope | Nov. 21, 1933 |
| 2,364,150 | Lowenstein | Dec. 5, 1944 |
| 1,923,967 | Brown, Jr. | Aug. 22, 1933 |
| 2,164,455 | Hart | July 4, 1939 |
| 827,062 | Frain | July 24, 1906 |

FOREIGN PATENTS

| Number | Country | Date |
|---|---|---|
| 122,124 | Switzerland | Aug. 16, 1927 |